No. 644,843. Patented Mar. 6, 1900.
A. BINK.
MOTOR VEHICLE.
(Application filed Apr. 27, 1899.)
(No Model.) 2 Sheets—Sheet 1.
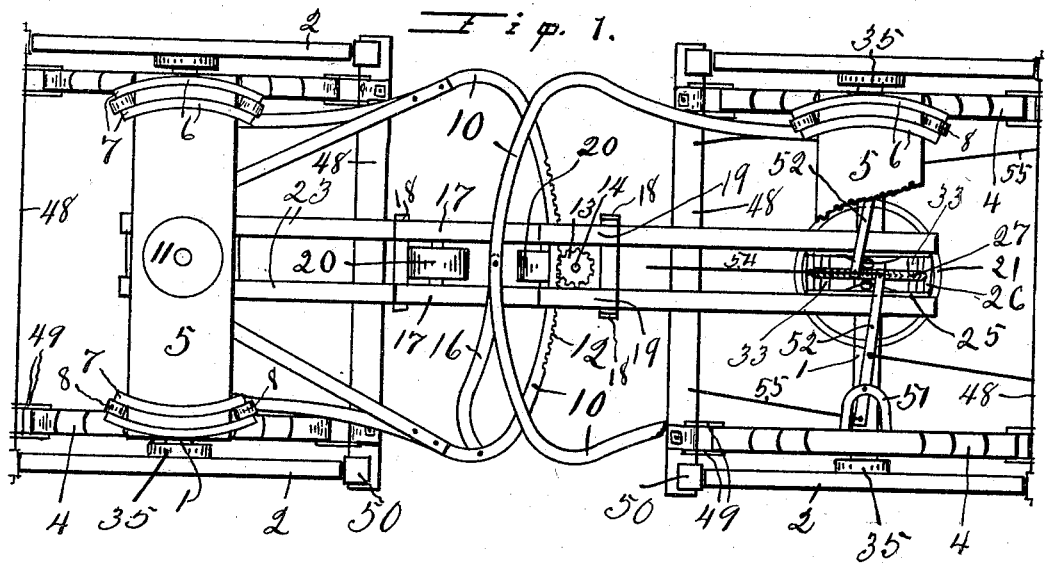
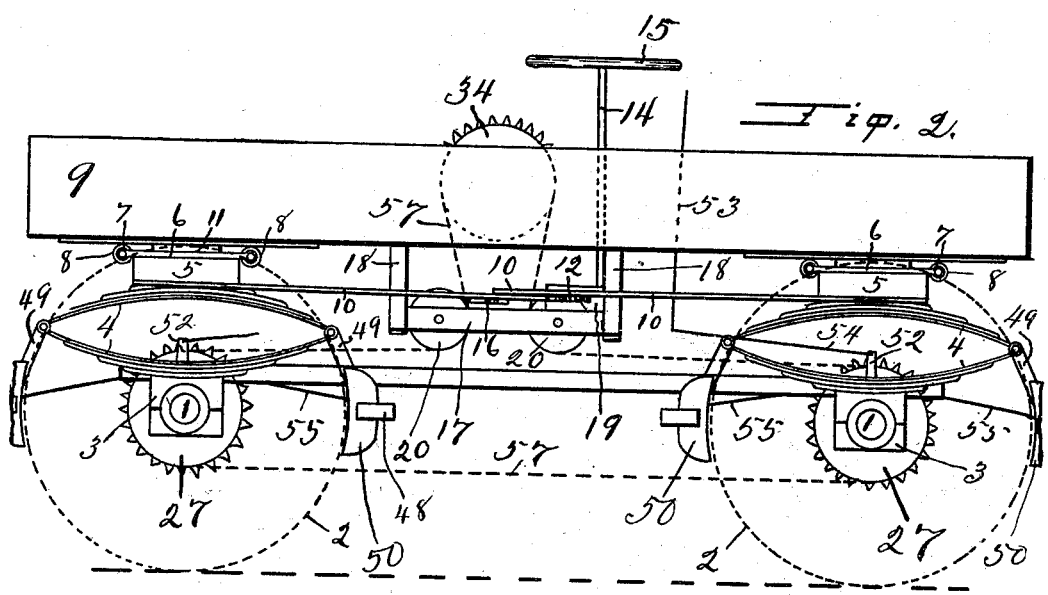
Witnesses
M. Haynes
V. A. Webster
Inventor
Anthony Bink
By Joshua B. Webster
Attorney
THE NORRIS PETERS CO., PHOTO-LITHO., WASHINGTON, D. C.

No. 644,843. Patented Mar. 6, 1900.
A. BINK.
MOTOR VEHICLE.
(Application filed Apr. 27, 1899.)
(No Model.) 2 Sheets—Sheet 2.
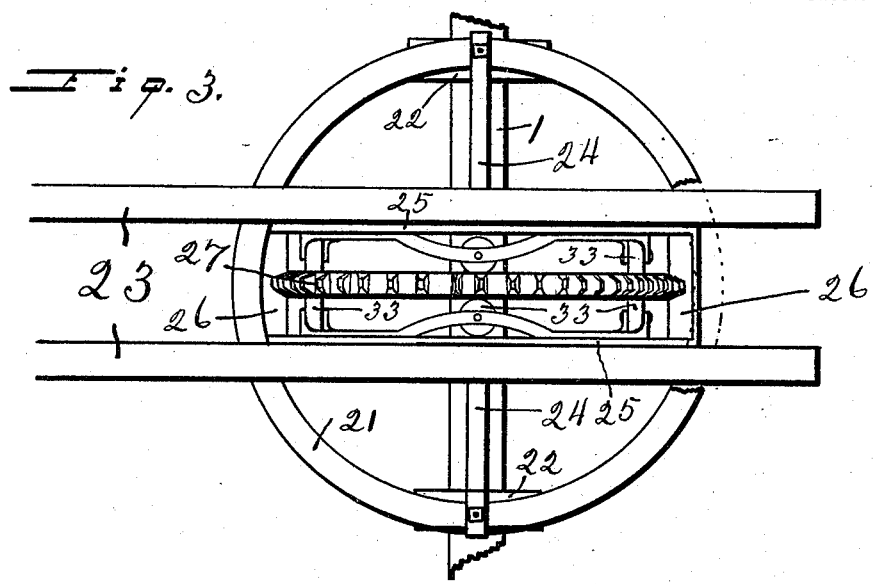
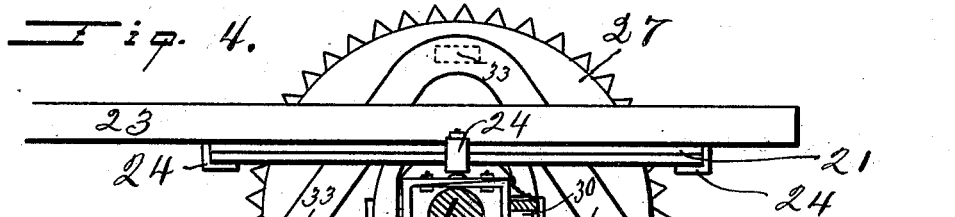
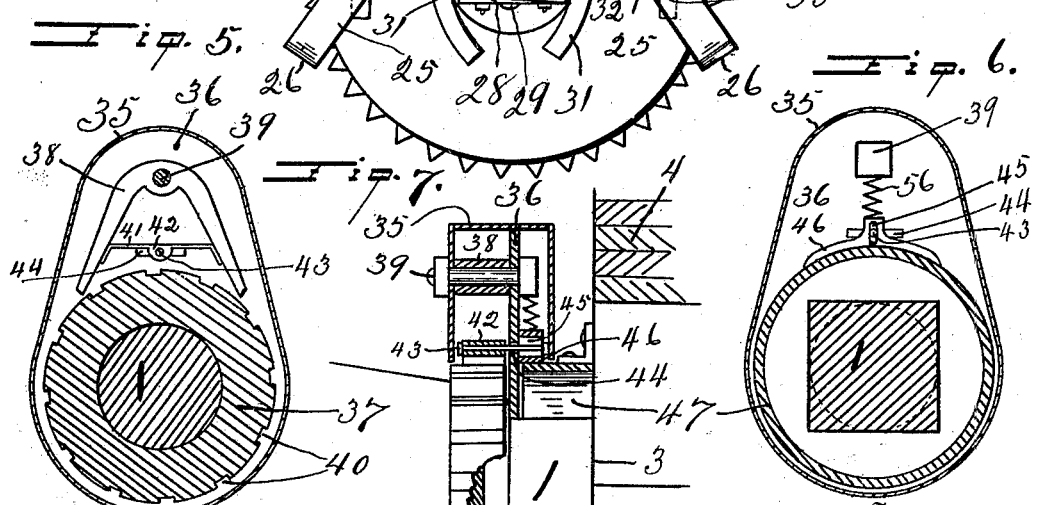
Witnesses
M. Haynes
V. A. Webster
Inventor
Anthony Bink
By Joshua B. Webster
Attorney
THE NORRIS PETERS CO., PHOTO-LITHO., WASHINGTON, D. C.

UNITED STATES PATENT OFFICE.

ANTHONY BINK, OF STOCKTON, CALIFORNIA.

MOTOR-VEHICLE.

SPECIFICATION forming part of Letters Patent No. 644,843, dated March 6, 1900.

Application filed April 27, 1899. Serial No. 714,672. (No model.)

*To all whom it may concern:*

Be it known that I, ANTHONY BINK, a citizen of the United States, residing at Stockton, in the county of San Joaquin and State of California, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to certain improvements in that class of vehicles which are adapted to be propelled by mechanical power, known as "motor-vehicles;" and my object is to furnish a motor-vehicle which will possess a maximum traction power with a minimum mechanical power and which will be cheap of construction, effective in operation and adaptability, and easily manipulated. This I accomplish by the peculiar construction, novel combination, and adaptation of parts hereinafter described, and particularly pointed out in the claims hereunto annexed, reference being had to the accompanying drawings for a better comprehension hereof, in which—

Figure 1 is a plan view of the running-gear with the body or bed removed. Fig. 2 is a side elevation of the same with the body or bed in position. Fig. 3 is a plan view of one of the axle-propelling gears and its attendant guides and frame. Fig. 4 is a side elevation of the same. Fig. 5 is an end view of one of the clutches or ratchets of the wheels with the outside casing removed and the axle and hub of the wheel in section. Fig. 6 is a similar view of the reverse end of the same, showing the reversing friction-ring and axle in section. Fig. 7 is a longitudinal section of the same.

Similar figures of reference indicate corresponding parts in the several views.

1 represents two axles, which are round and of the desired length and mounted on suitable wheels 2. Near said wheels 2 at either end of said axles 1 suitable journal-boxes 3 comprehend the axles 1 and have suitable springs 4 mounted on the same. Upon said springs 4 suitable bolsters 5 are rigidly attached. Double straps 6 are arranged transversely across the top near the end of the bolsters 5 and have their ends formed into eyes 7, in which suitable rollers 8 are journaled. A suitable body 9 is arranged on the bolsters 5 and pivotally attached to the center 11 of each of said bolsters 5 and adapted to rest on the rollers 8.

A steering-gear composed of curved straps or bars 10 is arranged beneath the body 9, said straps or bars 10 having their ends attached to the under side of the bolsters 5 and their centers or curved portions extending toward the center of the body. The center portion of said bars or straps 10 is curved concentrically with the center 11 of each bolster, and one of the bars 10 has teeth 12 on its convex side, which are adapted to engage with a pinion 13, which is rigidly mounted on a vertical shaft 14, suitably journaled in the body 9, and has a hand-wheel 15 rigidly attached thereto, wherewith the direction of the vehicle may be controlled. The straps or rods 10 may be braced in any desired manner and communicate motion to one another by means of a brace or lever 16, which is pivotally attached to the center of one strap 10 and to the side of the other strap 10. (Shown in Fig. 1.)

Beneath the center of the body 9 two horizontal bars 17 are arranged longitudinally with said body 9 and maintained in rigid position by means of braces 18, which are rigidly attached to the under side of the body 9.

A block 19, having a slot in one end, is placed upon and rigidly attached to each of the bars 17 for the purpose of guiding the rods or straps 10, one of which is adapted to operate in the slots in the blocks 19.

The horizontal bars 17 are adapted to carry two tightening or guide pulleys 20 between the same, which pulleys 20 are suitably journaled therein, for the purpose as will be shown.

A fifth-wheel 21 has its lower segment rigidly attached on opposite sides to journal-bearings 22, which comprehend the axles equidistant on either side of the center longitudinally of the same. Upon the upper sections of the fifth-wheels 21 a double reach 23 is rigidly attached in the position shown in Figs. 3 and 4. Suitable hooks or stay-bolts 24 are inserted in the reach and adapted to engage with the fifth-wheels for the purpose of maintaining said fifth-wheels in position. A pair of inverted-V-shaped straps 25 is arranged one on the inner side of each section of the double reach 23, at each end thereof, each pair of said straps 25 being connected at their lower ends by a bar 26 for the purpose of rendering the same more rigid and stiff.

A sprocket-wheel 27 of suitable diameter is attached to the center of each axle 1 by a universal joint composed of a double clamp 28, adapted to comprehend the center of the axle, with a bolt or pin 29 inserted through the clamp 28 and into the said axle 1, upon which bolt 29 said clamp 28 is adapted to turn when the vehicle is turning. The said clamps each have a pin 30 rigidly inserted in the same, so as to protrude beyond the outside edge at right angles to the bolt or pin 29. The center of the sprocket-wheel 27 is cut away and has a strap 31 rigidly attached on opposite sides of said opening in the center, said straps having lugs 32 formed on one side, so as to enter the opening in said wheel 27, into which lugs the said pins 30 are adapted to be flexibly inserted.

By the use of the universal joint in each of the wheels 27 the axle 1, when the vehicle is turning, may be placed at an angle to the plane of the sprocket-wheels 27 without disabling said sprocket-wheels 27. The said sprocket-wheels 27 are each maintained parallel with the reach 23 and vertical by means of guide-rollers 33, which are suitably journaled in braces on the straps 25 at suitable points thereon.

A sprocket-chain or chain belt 57 is arranged over the two sprocket-wheels 27 and passes beneath the guide-pulleys 20 up through the bottom of the body 9 and engages with a sprocket-wheel 34, suitably journaled in said body 9, which wheel 34 may be propelled by any desired motive power wherewith the vehicle may be propelled. The guide-pulleys 20 and sprocket-wheels 27 and 34 may be replaced by grooved or V pulleys and a rope used as a power-transmitter instead of a sprocket-chain or chain belt.

The axles 1 are flexibly inserted in the wheels 2 and communicate motion to said wheels by reason of an automatic clutch or ratchet incased in the casing 35 and consisting, essentially, as follows: A plate 36, oval in shape, having a square opening therein, is inserted over the ends of the axles 1 immediately in the rear of the hub 37 of the wheel 2, where it is rigidly attached. The casing 35 is attached over said plate 36, at right angles thereto. On the front side of the plate 36, as shown in Fig. 5, a crescent-shaped double pawl 38 is pivotally suspended from a bolt 39, which is inserted in an opening in the plate 35 from the rear, as shown in Fig. 7. The pawl 38 is adapted to engage with notches 40, arranged on the hubs of the wheels 2, which hubs are adapted to rotate in close proximity to the plate 35 and immediately beneath the pawl 38. The pawl 38 has a bar 41 attached near its points, connecting the same, which bar 41 has a lug 42, with an opening therein, inserted on the center of the same. A bolt 43 is inserted in the opening in the lug 42 and extends horizontally through a slot 44 in the plate 36, where it engages with a slot 45, arranged in a friction-regulator 46, which is situated on the rear side of the plate 36 and adapted to engage with a friction-ring 47, rigidly attached to the outer face of the journal-bearings 3. The slot 45 is arranged in the friction-regulator 46 for the purpose of providing for the wear of the said regulator 46. A spring 56 of suitable pattern is inserted between the head of the bolt 39 and the top of the regulator 46 for the purpose of maintaining said regulator 46 in close engagement with the friction-ring 47. A thin plate of suitable material is placed on the front and rear sides of the clutch for the purpose of keeping the dust out.

I employ a brake which has its brake-bars 48 suspended from the ends of the springs 4 by suitable straps 49. Suitable brake-shoes 50 are attached to the brake-bars and adapted to engage with the wheels 2. A U-shaped iron 51 is rigidly attached to the center of the bottom of the springs 4, as shown in Fig. 1, to each of which irons 51 a lever 52 is pivotally attached, which extends toward the center of the axle over the wheels 27, whereupon the levers 52, extending from the opposite sides, have their inner ends attached together in a flexible manner and are connected to a rod 54, which is adapted to extend to any suitable location on the body and engage with a suitable lever 53, wherewith the brakes may be operated. The brake-bars are operated by rods 55, which engage with the said brake-bars and the levers 52.

The mode of operating my improved motor-vehicle is as follows: Motion having been imparted to the wheel 34 by suitable power, the belt 57, which engages the same, imparts motion to the wheels 27, whereby the axles 1 are rotated. As the axle 1 is rotated, the plate 36, being rigidly attached thereto, rotates also. The friction-regulator 46 by reason of its engagement with the friction-ring 47 retards the motion of the points of the double pawl 38, thereby causing one of its points to engage with a notch in the hub of the wheel, causing said wheel to rotate with the axle. While turning, the wheel on the outside of the turn is allowed to rotate faster than the axle by reason of the friction-regulator 46 pressing the pawl 38 rearwardly, whereupon the notches slip past said pawl. When the axle is rotated in the opposite direction, the friction-ring, being always rigid, causes the pawl 38 to press in the opposite direction, thereby rotating the wheels in the opposite direction. In turning, the universal joints in the wheels 27 operate as all universal joints and maintain the said wheels parallel at all times with the reach 23 by reason of the guide-rollers 33.

The vehicle is guided by the wheel 15, with which the pinion 13 is operated, engaging with the cogs 12 in the bar 10, wherewith both axles are turned in opposite directions, thereby facilitating the turning of the vehicle. The body resting on the rollers 8 renders the turning more smooth and easy.

I am well aware that vehicles of this class have been constructed to be operated by mechanical power; but they are defective in many ways, and I do not claim them broadly; but What I do claim as new, and desire to secure by Letters Patent, is—

1. In a motor-vehicle the combination of two rotatable axles, wheels loosely mounted on the axles and having suitable notches in the hubs thereof, suitable clutches rigidly attached to the axles, and adapted to engage with said notches in each of the hubs, a suitable fifth-wheel journaled to the center of each axle, a reach attached to and connecting the said fifth-wheels, a suitable sprocket or grooved wheel attached to the center of each axle, a suitable chain belt adapted to engage with said sprocket or grooved wheel and a power-wheel located in the body, guide-pulleys located beneath the body, and the body aforesaid, mounted on bolsters, said bolsters mounted on springs which are journaled on the axles, all arranged and operating substantially as shown and described and for the purposes set forth.

2. In a motor-vehicle, the combination with a suitable running-gear of a clutch composed essentially of a plate 36 attached rigidly to the axle, a double dog or pawl 38 pivotally attached to said plate 36, the cross-bar 41 attached to said pawl 38, the bolt 43 inserted in said cross-bar 41 and the friction-regulator 46, said friction-regulator 46 adapted to engage with a friction-ring 47, said friction-ring 47 rigidly attached to springs or journal-boxes, the springs 56 adapted to engage with the friction-regulator 46 and the cogs or notches 40 arranged on the hubs of the wheels, all arranged and operating substantially as shown and described.

In testimony whereof I affix my signature in presence of two witnesses.

ANTHONY BINK.

Witnesses:
JAMES T. SUMMERVILLE,
M. HAYNES.